United States Patent Office 3,287,860
Patented Nov. 29, 1966

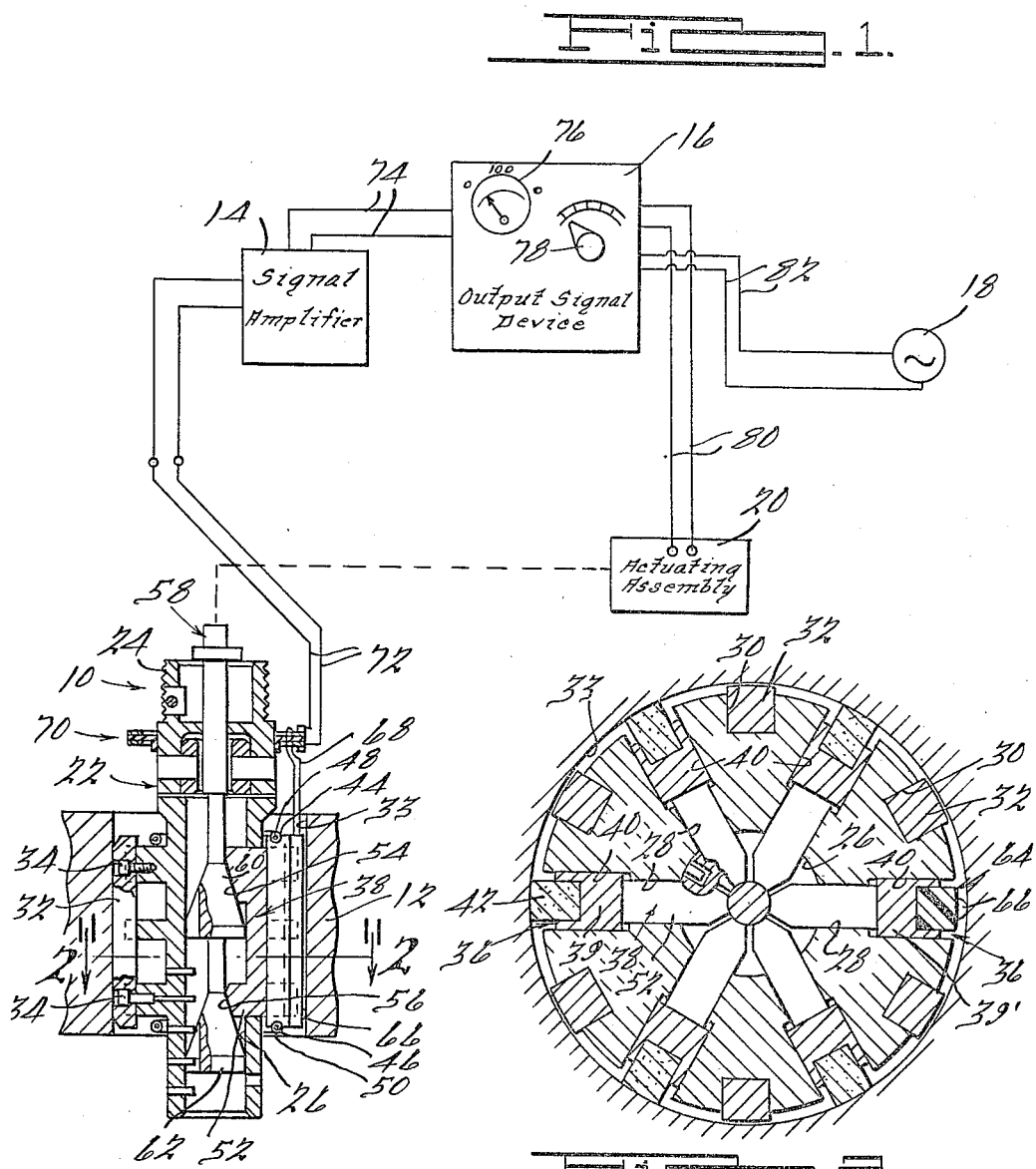

3,287,860
INTERFACE ENERGY CONTROL
Kenneth R. Blake, Huntington, Ind., assignor to Micromatic Hone Corporation, Detroit, Mich., a corporation of Michigan
Filed Sept. 4, 1964, Ser. No. 394,473
11 Claims. (Cl. 51—165)

This invention relates to stock removal apparatus, and more particularly, to low velocity abrading apparatus, such as honing apparatus or the like, and to abrading or honing methods.

In general, low velocity abrading or honing apparatus operates a workpiece at a rate of around 200 surface feet per minute. With such honing apparatus, it has been determined that an ideal temperature will be attained at the interface between the workpiece and the honing tool when the honing operation is being ideally performed. The interface can be considered to be a very thin layer of material of the workpiece immediately in engagement with the honing tool. The ideal temperature will vary from one material to another, and with any one material, will vary with the hardness. Thus, for the honing of a particular part of a given material with a given type of honing tool, the abrading rate and pressure can be varied relatively and an ideal temperature determined for one set of operating conditions. At this ideal temperature, the material at the interface is at a high degree of fluidity which facilitates stock removal and enhances the life of the honing tool. This high degree of fluidity also prevents an excessive amount of heat to be transferred to the workpiece, and hence, prevents the occurrence of excessive temperatures and resultant damage to the workpiece and tool. Thus, if the honing tool is glazed and its cutting effectiveness has been impaired, the interface temperature will exceed the ideal temperature by a detectable amount. If excessive forces have been applied to the honing tool, and the metal is being removed at too great a rate, the interface temperature will be detectably less than the ideal temperature; under this condition the fluidity of the metal is decreased, and premature failure of the honing tool will occur.

In low velocity abrading apparatus it has been ascertained that the temperature of an area proximate to the interface provides an accurate index of the interface temperature. In the present invention, the former temperature is sensed and used to provide a signal having a magnitude which is indicative of the interface temperature; this signal is used to trigger appropriate apparatus whereby corrective steps are automatically taken if the signal indicates a deviation from the ideal temperature. Therefore, it is an object of this invention to provide apparatus for use with low velocity abrading apparatus for providing a signal having a magnitude indicating the magnitude of the interface temperature; with reference to the previous object, it is a further object to provide apparatus responsive to this signal for applying corrective steps when the interface temperature deviates from a preselected, known operating temperature.

It should be noted that the apparatus of the present invention is not applicable to a high velocity apparatus, such as grinding, which operates against a workpiece and at a rate of around 5000 surface feet per minute. With high velocity apparatus, high local temperatures of the workpiece are encountered and the relationship of an ideal temperature at the interface as an indication of a proper cutting rate does not apply. Therefore, it is a general object of this invention to provide an improvement in low velocity abrading apparatus. Along the line of the previous discussion, it is another general object of this invention to provide a new and useful abrading method.

Other objects, features, and advantages of the present invention will become apparent from the subsequent description and the appended claims, taken in conjunction with the accompanying drawing in which:

FIGURE 1 is a diagrammatic drawing of the apparatus of the present invention, including a sectional, elevational view of a honing and temperature detecting assembly shown in working relationship with a workpiece; and FIGURE 2 is an enlarged, sectional view of the honing and temperature detecting assembly taken substantially along the line 2—2.

Looking now to FIGURE 1, a preferred embodiment of the present invention is shown and includes a honing and temperature detecting assembly 10 which is depicted in working relationship with a workpiece 12, a signal amplifier 14, an output signal device 16, a first indicating device 18, and an actuating assembly 20.

The honing and detecting assembly 10 includes an elongated tubular housing member 22, which terminates in a threaded end portion 24, whereby the housing member 22 can be secured to means (not shown) well known in the art for simultaneously rotating and reciprocating the assembly 10. The housing member 22 has a central bore 26 and has a plurality of axially extending, circumferentially spaced slots 28 which radially communicate with the bore 26 (FIGURE 2) and which terminate at their radially outer ends in an enlarged portion 40. A second plurality of axially extending slots 30 are located alternately with through slots 28 and are disposed at the radially outer periphery of the housing member 22. A plurality of hardened guide members 32 are located in the closed slots 30, and define at their outer periphery a cylinder of a diameter substantially equal to the diameter of a bore 33 to be honed in the workpiece 12. The guide members 32 are substantially non-abrasive and serve to guide the assembly 10, and also generally define the diameter of the bore to be honed. The guide members 32 are held to the housing member 22 by bolts 34, which are recessed radially inwardly.

In each of the through slots 28 is located a hone assembly such as assembly 36. The assembly 36 includes a stone holder 38, which has an enlarged portion 39 of a shape similar to that of the enlarged sized portion 40 of the through slot 28, and which is movable radially within the slot 28.

A honing stone 42 is fixed to the radially outer surface of the holder 38. The holder 38 has notches 44 and 46 at opposite ends in which are located annular spring members 48 and 50, respectively. The springs 48 and 50 are similarly secured to each of the hone assemblies, such as assembly 36, and are pretensioned to urge the hone assemblies to the radially inward extremity of enlarged portions 40 of through slots 28, and out of engagement with the bore to be honed.

A reduced section portion 52 of the holder 38 extends radially into the bore 26 and has a pair of longitudinally spaced, similarly inclined portions 54 and 56. An actuating spindle 58 has a pair of longitudinally spaced cone portions 60 and 62 which are inclined similarly to and engageable with inclined portion 54 and 56, respectively. The spindle 58 can be moved longitudinally independently of the housing member 22 by means (not shown) well known in the art; the latter means could be hydraulically actuated. Hence, by moving the spindle 58 upwardly as shown in FIGURE 1, the cone portions 60 and 62 are moved into engagement with the inclined portions 54 and 56, respectively, causing the hone assembly 36 to be moved radially outwardly into engagement with the wall of the bore to be honed, e.g., bore 33. Upon movement of the spindle 58 in an opposite direction, the hone assemblies 36 are retracted radially inwardly by the springs 48 and 50, and the stones 42 are moved out of engagement with the wall of the bore. By varying the force applied to the spindle 58, the pressure which the stones 42 exert against the wall of the bore can be selected. This force is selected to be of a magnitude relative to the speeds of rotation and reciprocation of the assembly 10 such as to provide the ideal interface temperature at the surface of the bore to be honed.

In order to sense the interface temperature, a modified hone assembly 36' is located in one of the through slots 28. The assembly 36' is identical to the assembly 36 except that a thermocouple assembly 64 is held by the stone holder 39. The thermocouple assembly 64 has a junction 66 extending outwardly and engageable with the wall of the bore to be honed. Hence, the junction 66 is in contact with the exact surface being honed and will provide an indication in a conventional manner of the temperature of this surface. The dissimilar metals of junction 66 are connected to a pair of conductors 68, which in turn are connected to the signal amplifier 14 via a conventional slip ring assembly 70 and a second pair of conductors 72. The signal amplifier 14 can be of a conventional construction for providing an amplified output potential having a magnitude varying in accordance with the difference in potential caused as a result of the difference in temperature between the hot junction 66 and a similarly constructed cold junction (not shown). Since the amplifier 14 can be of a type well known in the art and the specific details thereof do not constitute a part of the present invention, these details have been omitted for the purpose of simplicity.

The output from the signal amplifier 14 will be a direct voltage signal which is coupled to the output signal device 16 via conductor 74. The output signal device 16 includes a voltmeter 76 which is calibrated in percent of honing efficiency with 100% efficiency representing that point at which the interface temperature is at the ideal temperature. The voltmeter 76, then, provides a visual means whereby the operator can check the efficiency of that particular honing operation. The signal into the device 16 is also fed to the input of an electronic pulse circuit which will provide an output pulse when the direct potential signal reaches a preselected maximum magnitude indicating that the honing operation is operating at an interface temperature greater than the ideal temperature. The electronic pulse circuit can be of a type well known in the art and for example could use a thyratron type tube with the direct voltage signal providing a bias signal for the grid to determine the firing point. The electronic pulse circuit would be arranged such that the thyratron would not fire until the direct voltage signal attained a selected level indicating that the interface temperature had increased to a selected magnitude. This preselected firing point of the thyratron is provided to be adjustable by means of a potentiometer 78. Since the specific details of the electronic pulse circuit in no way constitute a part of the present invention and since these details are readily within the knowledge of one skilled in the art, these details have been omitted for the sake of simplicity. One of the most common reasons for the interface temperature to increase is caused by the honing stones loading up or becoming glazed. This glazed condition can be corrected by jarring, pulsing or otherwise delivering energy to the honing stones. This condition can be detected and automatically corrected by the apparatus of FIGURE 1, thus the output pulse from the electronic pulse circuit of the signal device 16 is fed to the actuating assembly 20 via conductors 80. The actuating assembly 20 is connected to the means for actuating the spindle 58 and applies a pulse thereto in response to the output pulse from signal device 16 whereby the force on the spindle 58 is momentarily, sharply increased; assuming the spindle 58 is actuated by fluid pressure then the actuating assembly 20 would, in response to the output pulse from signal device 16, momentarily, sharply increase the fluid pressure. By thus pulsing the spindle 58 the honing stones 42 would be similarly pulsed. The stones 42 would continue to be periodically pulsed causing them to deglaze and once again establish proper cutting action. With the proper cutting action re-established the ideal temperature is again reached and the pulsing is stopped.

The signal device 16 is provided with additional circuitry (not shown, but of a type well known in the art) for providing an output signal at conductor 82 when the direct voltage signal reaches a preselected low magnitude. This indicates a honing condition at which the interface temperature is less than the ideal temperature and further indicates that too much stock is being removed and that excessive stone wear will occur unless correction is made. This also could be an indication that an improper abrasive is being used. The signal at conductor 82 is fed to the lamp 18 and hence provides a visual indication or warning to the operator of the honing condition. Alternatively the signal at conductor 82 could be utilized to automatically terminate the honing operation and prevent damage to the honing stones.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In low velocity abrading apparatus for removing the material of a workpiece with a work member with the temperature at the interface between the workpiece and the work member reaching a predetermined ideal temperature at which the abrading operation is ideally performed, apparatus comprising: means for sensing the temperature of the surface of the workpiece proximate the interface between the workpiece and the work member and for providing an output signal having a magnitude varying in accordance with variations in the sensed temperature, and having a predetermined magnitude when the sensed temperature indicates establishment of the ideal temperature at the interface, and means responsive to said output signal for providing a signal when said output signal has a magnitude a preselected difference from said predetermined magnitude.

2. In a low velocity honing apparatus for removing the material of a workpiece with a honing stone with the temperature at the interface between the workpiece and the stone reaching a predetermined ideal temperature at which the honing operation is ideally performed, apparatus comprising: means for sensing the temperature of the surface of the workpiece proximate the interface between the workpiece and the stone, and means responsive to the sensed temperature for momentarily adding energy to the interface between the workpiece and the stone when the sensed temperature indicates the interface temperature to be a preselected amount above the ideal temperature.

3. In low velocity honing apparatus for removing the material of a workpiece with a honing stone with the temperature at the interface between the workpiece and the stone reaching a predetermined ideal temperature at which the honing operation is ideally performed, apparatus comprising: means for sensing the temperature of the surface of the workpiece proximate the interface between the workpiece and the stone, and means responsive to the sensed temperature for momentarily increasing the pressure of the stone against the workpiece when the sensed temperature indicates the interface temperature to be a preselected amount above the ideal temperature.

4. In low velocity abrading apparatus for removing the material of a workpiece with a work member with the temperature at the interface between the workpiece and the work member reaching a predetermined ideal temperature at which the abrading operation is ideally performed, apparatus comprising: means for sensing the temperature of the surface of the workpiece proximate the interface between the workpiece and the work member and for providing an output signal having a magnitude varying in accordance with variations in the sensed temperature, and having a predetermined magnitude when the sensed temperature indicates establishment of the ideal temperature at the interface, and means responsive to said output signal for providing a first signal when said output signal has a magnitude a preselected amount greater than said predetermined magnitude and for providing a second signal when said output signal has a magnitude a preselected amount less than said predetermined magnitude.

5. In low velocity honing apparatus for honing a workpiece with a honing stone with the temperature at the interface between the workpiece and the stone reaching a predetermined ideal temperature at which the honing operation is ideally performed with the interface temperature increasing as the stone becomes glazed, apparatus comprising: means including a thermocouple for sensing the temperature of the surface of the workpiece proximate the interface between the workpiece and the stone, amplifier means connected to said thermocouple for providing an amplified electrical signal having a magnitude varying in accordance with the magnitude of the sensed temperature and having a predetermined magnitude when the sensed temperature indicates establishment of the ideal temperature at the interface, and means responsive to said electrical signal for momentarily increasing the pressure of the stone against the workpiece when said electrical signal has a magnitude a preselected amount greater than said predetermined magnitude.

6. In low velocity honing apparatus for honing a workpiece with a honing stone with the temperature at the interface between the workpiece and the stone reaching a predetermined ideal temperature at which the honing operation is ideally performed with the interface temperature increasing as the stone becomes glazed, and decreasing when the pressure of the stone against the workpiece is excessive, apparatus comprising: means including a thermocouple for sensing the temperature of the surface of the workpiece proximate the interface between the workpiece and the stone, amplifier means connected to said thermocouple for providing an amplified electrical signal having a magnitude varying in accordance with the magnitude of the sensed temperature and having a predetermined magnitude when the sensed temperature indicates establishment of the ideal temperature at the interface, and means responsive to said electrical signal for momentarily increasing the pressure of the stone against the workpiece when said electrical signal has a magnitude a preselected amount greater than said predetermined magnitude and for providing an electrical output signal when said electrical signal has a magnitude a preselected amount less than said predetermined magnitude.

7. In low velocity honing apparatus for honing the internal surface of a bore by a combined reciprocating and rotational motion with a honing stone with the temperature at the interface between the bore surface and the stone reaching a predetermined ideal temperature at which the honing operation is ideally performed with the interface temperature increasing as the stone becomes glazed, apparatus comprising: means including a thermocouple for sensing the temperature of the bore surface proximate the interface between the bore surface and the stone, amplifier means connected to said thermocouple for providing an amplified electrical signal having a magnitude varying in accordance with the magnitude of the sensed temperature and having a predetermined magnitude when the sensed temperature indicates establishment of the ideal temperature at the interface, and means responsive to said electrical signal for momentarily increasing the pressure of the stone against the bore surface when said electrical signal has a magnitude a preselected amount greater than said predetermined magnitude.

8. In low velocity honing apparatus for honing the internal surface of a bore by a combined reciprocating and rotational motion with a honing stone with the temperature at the interface between the bore surface and the stone reaching a predetermined ideal temperature at which the honing operation is ideally performed with the interface temperature increasing as the stone becomes glazed and decreasing when the pressure of the stone against the bore surface is excessive, apparatus comprising: means including a thermocouple for sensing the temperature of the bore surface proximate the interface between the bore surface and the stone, amplifier means connected to said thermocouple for providing an amplified electrical signal having a magnitude varying in accordance with the magnitude of the sensed temperature and having a predetermined magnitude when the sensed temperature indicates establishment of the ideal temperature at the interface, and means responsive to said electrical signal for momentarily increasing the pressure of the stone against the bore surface when said electrical signal has a magnitude a preselected amount greater than said predetermined magnitude and for providing an electrical output signal when said electrical signal has a magnitude a preselected amount less than said predetermined magnitude.

9. The method of abrading a workpiece with low velocity abrading apparatus comprising the steps of: determining the ideal temperature at the interface between the workpiece and the work member of the abrading apparatus at which the abrading operation is ideally performed, sensing the temperature of the surface of the workpiece proximate the interface between the workpiece and the work member, and momentarily adding energy to the interface between the workpiece and the work member when the sensed temperature indicates the temperature at the interface to be a preselected amount above the ideal temperature.

10. The method of honing a workpiece with a honing stone with low velocity honing apparatus comprising the steps of: determining the ideal temperature at the interface between the workpiece and the honing stone at which the honing operation is ideally performed, sensing the temperature of the surface of the workpiece proximate the interface between the workpiece and the honing stone, and momentarily increasing the pressure of the honing stone against the workpiece when the sensed temperature indicates the temperature at the interface to be a preselected amount above the ideal temperature.

11. The method of honing the internal surfaces of a bore with a honing stone with low velocity honing apparatus comprising the steps of: determining the ideal temperature at the interface between the bore surface and the honing stone at which the honing operation is ideally performed, sensing the temperature of the bore surface proximate the interface between the bore surface and the honing stone, and momentarily varying the pressure of the honing stone against the bore surface when the sensed temperature indicates the temperature at the interface to be a preselected amount above the ideal temperature.

References Cited by the Examiner

UNITED STATES PATENTS

| 2,191,256 | 2/1940 | Dunbar et al. | 51—342 |
| 2,777,257 | 1/1957 | Johnson | 51—34 |

LESTER M. SWINGLE, *Primary Examiner.*